United States Patent [19]
Furth et al.

[11] Patent Number: 4,713,208
[45] Date of Patent: Dec. 15, 1987

[54] SPHEROMAK REACTOR WITH POLOIDAL FLUX-AMPLIFYING TRANSFORMER

[75] Inventors: Harold P. Furth, Princeton; Alan C. Janos, East Windsor, both of N.J.; Tadao Uyama, Osaka, Japan; Masaaki Yamada, Lawrenceville, N.J.

[73] Assignee: The United States of America as represented by the United States Department of Energy, Washington, D.C.

[21] Appl. No.: 866,031

[22] Filed: May 21, 1986

[51] Int. Cl.$^4$ .............................................. G21B 1/00
[52] U.S. Cl. .................................... 376/137; 376/128; 376/143
[58] Field of Search ........................ 376/137, 128, 143

[56] References Cited

U.S. PATENT DOCUMENTS

| | | | |
|---|---|---|---|
| 4,314,879 | 2/1982 | Hartman et al. | 376/128 |
| 4,363,776 | 12/1982 | Yamada et al. | 376/137 |
| 4,436,691 | 3/1984 | Jardin et al. | 376/137 |
| 4,476,085 | 10/1984 | Jardin et al. | 376/137 |
| 4,601,871 | 7/1986 | Turner | 376/128 |

Primary Examiner—Harvey E. Behrend
Attorney, Agent, or Firm—Gustavo Siller, Jr.; Paul A. Gottlieb; Judson R. Hightower

[57] ABSTRACT

An inductive transformer in the form of a solenoidal coils aligned along the major axis of a flux core induces poloidal flux along the flux core's axis. The current in the solenoidal coil is then reversed resulting in a poloidal flux swing and the conversion of a portion of the poloidal flux to a toroidal flux in generating a spheromak plasma wherein equilibrium approaches a force-free, minimum Taylor state during plasma formation, independent of the initial conditions or details of the formation. The spheromak plasma is sustained with the Taylor state maintained by oscillating the currents in the poloidal and toroidal field coils within the plasma-forming flux core. The poloidal flux transformer may be used either as an amplifier stage in a moving plasma reactor scenario for initial production of a spheromak plasma or as a method for sustaining a stationary plasma and further heating it. The solenoidal coil embodiment of the poloidal flux transformer can alternately be used in combination with a center conductive cylinder aligned along the length and outside of the solenoidal coil. This poloidal flux-amplifying inductive transformer approach allows for a relaxation of demanding current carrying requirements on the spheromak reactor's flux core, reduces plasma contamination arising from high voltage electrode discharge, and improves the efficiency of poloidal flux injection.

3 Claims, 9 Drawing Figures

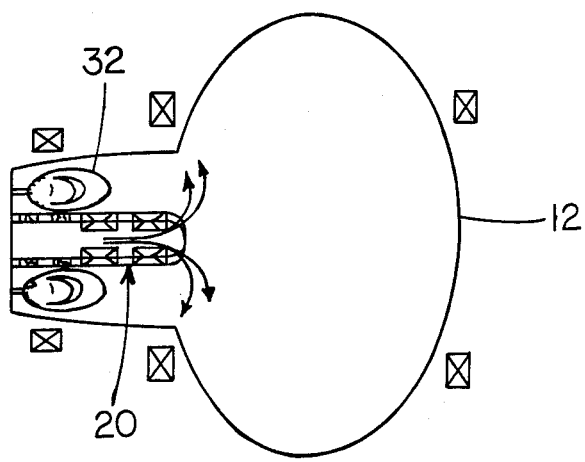
FIG. 5a
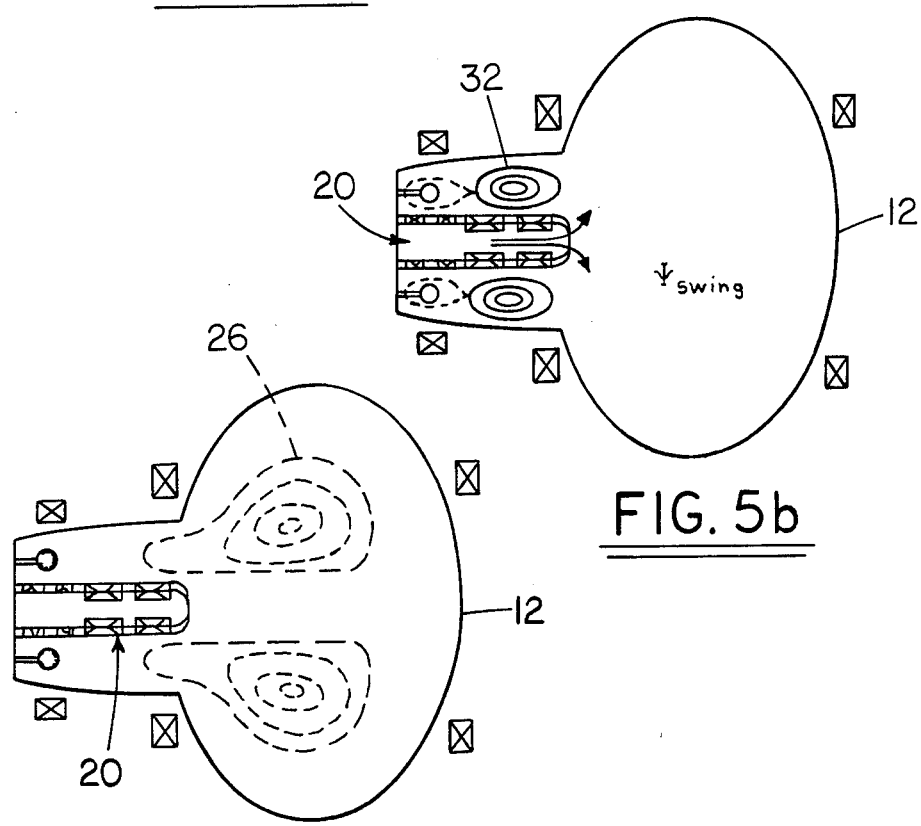
FIG. 5b
FIG. 5c

SPHEROMAK REACTOR WITH POLOIDAL FLUX-AMPLIFYING TRANSFORMER

CONTRACTUAL ORIGIN OF THE INVENTION

The U.S. Government has rights in this invention pursuant to Contract No. DE-AC02-76CH03073 between the U.S. Department of Energy and Princeton University.

CROSS-REFERENCE TO RELATED APPLICATION

The present invention is related, but in no way dependent upon, co-pending U.S. patent application Ser. No. 703,577, entitled STEADY-STATE INDUCTIVE SPHEROMAK OPERATION, filed Feb. 20, 1985, in the names of Alan C. Janos, Stephen C. Jardin and Masaaki Yamada.

BACKGROUND OF THE INVENTION

This invention relates generally to the generation and confinement of an energetic plasma by magnetic fields and is particularly directed to the initiation and sustaining of a fusion plasma in a sheromak reactor.

A spheremak reactor uses toroidal and poloidal magnetic fields to confine a doughnut-shaped plasma. In a speheromak, the currents generation the toroidal field within the plasma itself, eliminating the large external toroidal field coils required in tokamak reactors. The spheromak geometry therefore provides various advantages over that of the tokamak such as improved access to the plasma for placement of thermal conversion blankets, the creation of plasmas with low aspect ratios and increased stability, a high current density minimizing the requirement for auxiliary heating, and a high beta value representing the ratio of plasm pressure to magnetic field pressure.

The sustainment of the spheromak configuration is highly desirable for assisting in the attainment of fusion conditions from an initial discharge or for maintaining a steady-state fusion plasma. Sustainment is used to describe any method of actively driving plasma currents to either extend the discharge lifetime, maintain a steady-state discharge, or increase plasma currents after the formation phase. Steady-state or long-pulse (wherein the discharge time is much longer than a resistive decay time) operation has many advantages over pulsed operation including a reduction in mechanical fatigue due to cyclic magnetic and thermal stresses an an increase in energy efficiency by eliminating energy losses incurred during start-up of a discharge. Near term advantages of sustainment would be derived from the providing of a long lived, time-independent plasma so that the confinement properties of the spheromak could be easily studied.

Various techniques have been proposed for the sustainment of spheromaks. These proposals, which have met with only limited degrees of success, include the merging of spheromaks, the application of oscillating field current drive (OFCD) using audio frequencies, radio frequency current drive, the application of direct current (DC) from electrodes, the Rotamak concept, and neutral as well as charged particle beam injection. Present Alfvén electrode gun schemes have the advantage of a simple operation requirement that permits the plasma to be easily translated into the experimental area. In addition, the DC electrode gun approach has sustained spheromaks experimentally for much longer than a resistive decay time. However, this approach requires a substantial amount of electrode discharge to create the toroidal magnetic field and to propel the plasma through the electrode gun muzzle against poloidal field pressure. Furthermore, the possible advantage of inductive sustainment over DC current drive using electrodes is a potential reduction if impurity influx due to the elimination of a material surface, in contact with the plasma, through which large currents are drawn. Inductive sustainment is extendable to long time cycles and may be able to maintain a discharge indefinitely.

U.S. Pat. Nos. 4,363,776 to Yamada et al and 4,436,691 to Jardin et al, both assigned to the assignee of the present application, disclose inductive approaches to the formation and sustainment of a spheromak plasma. However, because inductively produced spheromak plasmas are subject to resistive decay and because heretofore the poloidal and toroidal fields have not been sustainable as both are produced in part or in whole, respectively, by plasma currents, the aforementioned inductive approaches have been used only in a pulsed operation, i.e., the method is repeated at regular intervals, and have not been suitable for continuous, or steady-state, operation.

The aforementioned, cross-referenced patent application also discloses an inductive approach to the sustainment of a spheromak plasma involving the initiating of a plasma discharge by means of the combination of poloidal and toroidal magnetic fields in an evacuated vacuum vessel containing a neutral species, wherein the poloidal magnetic field is comprised of first and second component poloidal magnetic fields of different strength. The thus produced plasma is allowed to expand in the direction of the weaker poloidal magnetic field, with a portion of the expanded plasma pinched off so as to produce a line-linked spheromak plasma partially connected to the toroidally shaped flux core within the vacuum vessel. The poloidal and toroidal magnetic fields $\psi$ and $\phi$ are then subject to oscillation such that $\psi$ and $\phi$ have different phases, where preferably the poloidal and magnetic fields are 90° out of phase. The plasma may be partially pinched off by either energizing a set of pinching coils or by simultaneously reversing the directions of the poloidal and toroidal currents in the flux core.

The present invention is directed to an arrangement for the inductive generation and sustainment of a spheromak plasma involving the use of a poloidal flux-amplifying inductive transformer aligned along the major axis of a flux core and comprised of a solenoidal coil. Reversal of the current in the solenoidal coil results in a poloidal flux swing and the conversion of a portion of the poloidal flux to toroidal flux for either plasma generation or sustainment.

OBJECTS AND SUMMARY OF THE INVENTION

Accordingly, it is an object of the present invention to provide for improved generation and sustainment of an energetic plasma in a spheromak fusion reactor.

It is another object of the present invention to inductively induce a large poloidal magnetic flux in a spheromak-shaped plasma utilizing a reduced magnetic field-generating current in a current-carrying flux core.

Yet another object of the present invention is to facilitate the formation and sustainment of a spheromak plasma using available technology which does not require an undue amount of research and development.

A further object of the present invention is to provide a thermonuclear fusion reactor for forming and sustaining a low impurity spheromak plasma by means of large alternating poloidal and toroidal magnetic fields.

The present invention contemplates a poloidal flux transformer in the form of a straight solenoidal coil positioned along the length of the major axis of a magnetic flux core for inductively inducing poloidal flux therein for the generation and sustaining of a spheromak plasma. The poloidal flux transformer may be used as an amplifier stage in a moving plasma reactor scenario to initiate the formation of a spheromak plasma as well as to translate and inject the plasma into a desired location. In the latter case, the initial or seed plasma is made by an inductive discharge around a flux varying core and its flux is increased during translation and injection of the plasma into a desired location by the poloidal flux transformer. The poloidal flux-amplifying inductive transformer makes use of the observed phenomenon of flux conversion wherein a poloidal flux is converted to a toroidal flux and vice versa, with the plasma assimilating the fluxes and relaxing toward a Taylor stable minimum energy equilibrium state. The present invention not only reduces the demanding current carrying requirements for the flux core, but also improves poloidal flux injection efficiency and reduces the impurities within the plasma.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIGS. 5a–5c illustrate in simplified schematic diagram form the injection of a spheromak plasma by the poloidal flux-amplifying inductive transformer of the present invention into a reaction chamber;

DETAILED DESCRIPTION OF A PREFERRED EMBODIMENT

Figure 1:
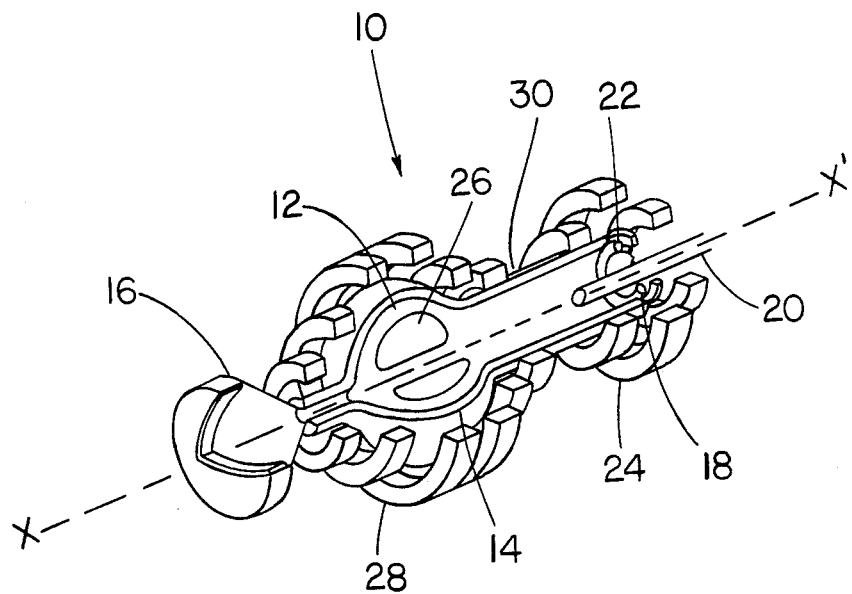
FIG. 1 is a simplified cutaway schematic diagram of a spheromak fusion reactor with which the poloidal flux-amplifying inductive transformer of the present invention is intended for use.

Referring to FIG. 1, there is shown a simplified cutaway schematic diagram of a spheromak fusion reactor 10 in which the poloidal flux-amplifying inductive transformer 20 of the present invention is intended for use. The spheromak fusion reactor 10 is comprised of a vacuum vessel 30 containing a neutral species of particles and having an elongated portion which is coupled to and continuous with an expanded portion which forms the reaction chamber 12 of the reactor. The longitudinal axis of the reactor 10 is indicated by the broken line X—X' in the figure.

Positioned within the elongated portion of the spheromak fusion reactor 10 and concentrically disposed about the inductive poloidal flux transformer 20 of the present invention is a flux core 22. The flux core 22 is formed in the shape of a torus and contains six internal poloidal field coils disposed within and around the length of the flux core. The flux core 22 further includes a 90-turn helically wound tordoidal field coil twisted so that its ends touch each other. Neither of the aforementioned magnetic field coils are shown in the figure for simplicity. Concentrically positioned about the elongated end portion of the vacuum vessel 30 are a plurality of circular equilibrium field coils 24 which generate magnetic fields to provide plasma equilibrium within the spheromak fusion reactor 10. A similar plurality of equilibrium field coils 28 are coaxially disposed about the reaction chamber 12 of the spheromak fusion reactor 10 for maintaining the plasma 26 in an equilibrium state therein. A spherical thermal conversion blanket 14 is disposed about the reactor's reacton chamber 12 for collecting the thermal energy generated therein for conversion to a more usable form. There may be also coupled to the reactor's reaction chamber 12 an energy diverter 16 for controlling the rate of reaction of the spheromak plasma 12 within the reaction chamber. The inductive poloidal flux transformer 20 of the present invention is intended for either generating a spheromak plasma in the elongated portion of the reactor 10 and directing the thus generated plasma into the reaction chamber 12 or for sustaining the spheromak plasma 12 within the reaction chamber as described below.

Figure 2:
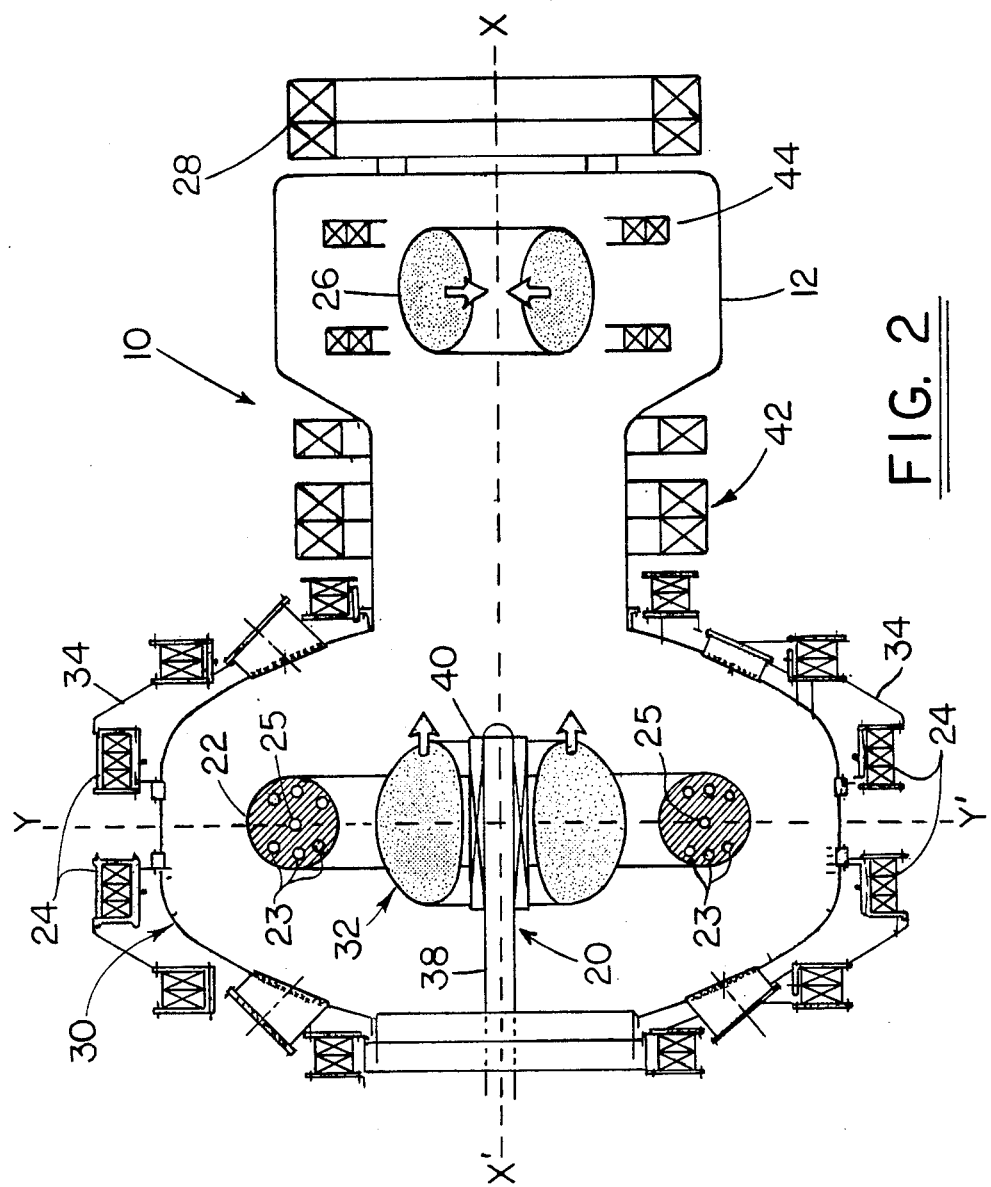
FIG. 2 is a sectional view of the poloidal flux-amplifying inductive transformer of the present invention illustrating the generation and displacement of plasma along the axis of a spheromak reactor.

Referring to FIG. 2, there is shown a sectional view of a spheromak fusion reactor 10 similar to the reactor illustrated in FIG. 1. The equilibrium field coils 24 are disposed outside of the vacuum vessel 30 concentrically about the flux core 22 so as to generate a magnetic field that is strongest at the outer edges of the flux core. The major axis of the flux core 22 is shown by the broken line X—X' in the figure which is coincident with the longitudinal axis of the spheromak reactor 10. In forming a spheromak plasma 32 within the vacuum vessel 30, the equilibrium field coils 24, which are coupled together by means of an electrical bus 34, are first switched on, followed by actuation of the poloidal field coils 23 within the flux core 22. The toroidal field coil 25 is then energized approximately 75 microseconds after actuation of the poloidal field coils 23, creating a high voltage near the surface of the flux core 22 and initiating the ionization of the neutral gas within the vacuum vessel 30 that creates the spheromak plasma 32. This process of plasma formation is facilitated by the inductive poloidal flux transformer 20 of the present invention as described in detail below.

The inductive poloidal flux transformer 20 includes a coaxial conductor 38 which extends through a wall within the vacuum vessel 30 and has a plurality of current transformer windings 40 disposed on the distal end of and electrically coupled to the coaxial conductor. The current transformer windings 40 are positioned within and along the major axis X—X' of the flux core 22 for generating a spheromak plasma 32 therein and translationally displacing the plasma as shown by the arrows in FIG. 2 toward and into the reaction chamber 12 of the spheromak fusion reactor 10. A plurality of generator driven coils 42 are disposed around and along the length of the spheromak fusion reactor 10 between the plasma formation portion thereof within which the inductive poloidal flux transformer 20 is located and the reaction chamber 12. A plurality of the aforementioned equilibrium field coils 28 are also disposed about the reaction chamber 12, which also includes a plurality of capacitor driven coils 44 therein. The various aforementioned coils generate a magnetic field within the spheromak fusion reactor 10 necessary for forming and confining the spheromak plasma generated therein.

The current in the poloidal field and toroidal field windings 23, 25 within the flux core 22 is changed, inducing poloidal and toroidal currents within the plasma 32. Simultaneously the equilibrium fields from the equilibrium field coils 24 push the ionized gas to the center of the reactor where the plasma's self-generated fields, aided by those of the aforementioned external coils, keep it confined. The fully formed plasma is shown as element 26 within reaction chamber 12 of the spheromak fusion reactor 10.

Figure 3:
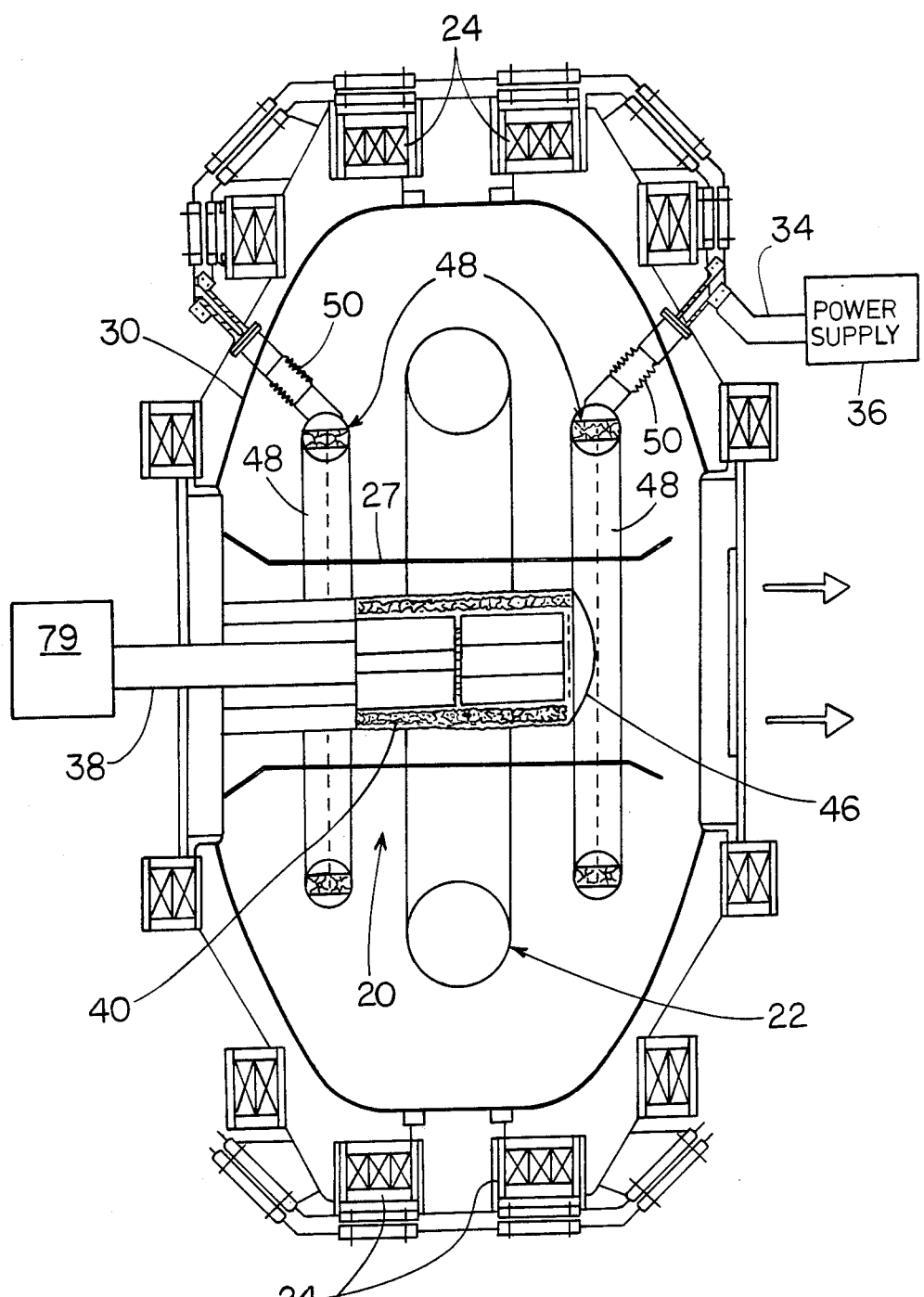
FIG. 3 is a sectional view illustrating the details of the positioning of the poloidal flux-amplifying inductive transformer of the present invention in a spheromak reactor.

Referring to FIG. 3, there is shown a sectional view of the portion of the spheromak fusion reactor wherein is positioned the inductive poloidal flux transformer 20 showing additional details of the installation. The plurality of equilibrium field coils 24 positioned outside of the vacuum vessel 30 are symmetrically disposed about the flux core 22 and are all coupled to a first power supply 36 by means of the aforementioned electrical bus 34. A pair of toroidally shaped equilibrium field pulsed (EFP) coils 48 are also coupled to the first power supply 36 and are supported within the vacuum vessel 30 by means of a respective insulated conductor 50. The EFP coils 48 stabilize the plasma formed by the flux core 22 and force the plasma away from the flux core along the longitudinal axis X—X' of the spheromak fusion reactor toward the reaction chamber thereof (not shown in FIG. 3) as shown by the direction of the arrows in the figure. The magnetic axis of the spheromak, after formation, is a typical radius of approximately 12 centimeters. The inductive poloidal flux transformer 20 further includes an outer liner assembly 46 extending around the circumference of the flux transformer and disposed along the length thereof. A center conductive cylinder 27 may be coaxially disposed about the flux transformer 20 along the length thereof and within the flux core 22 to facilitate spheromak plasma formation.

Figure 4:
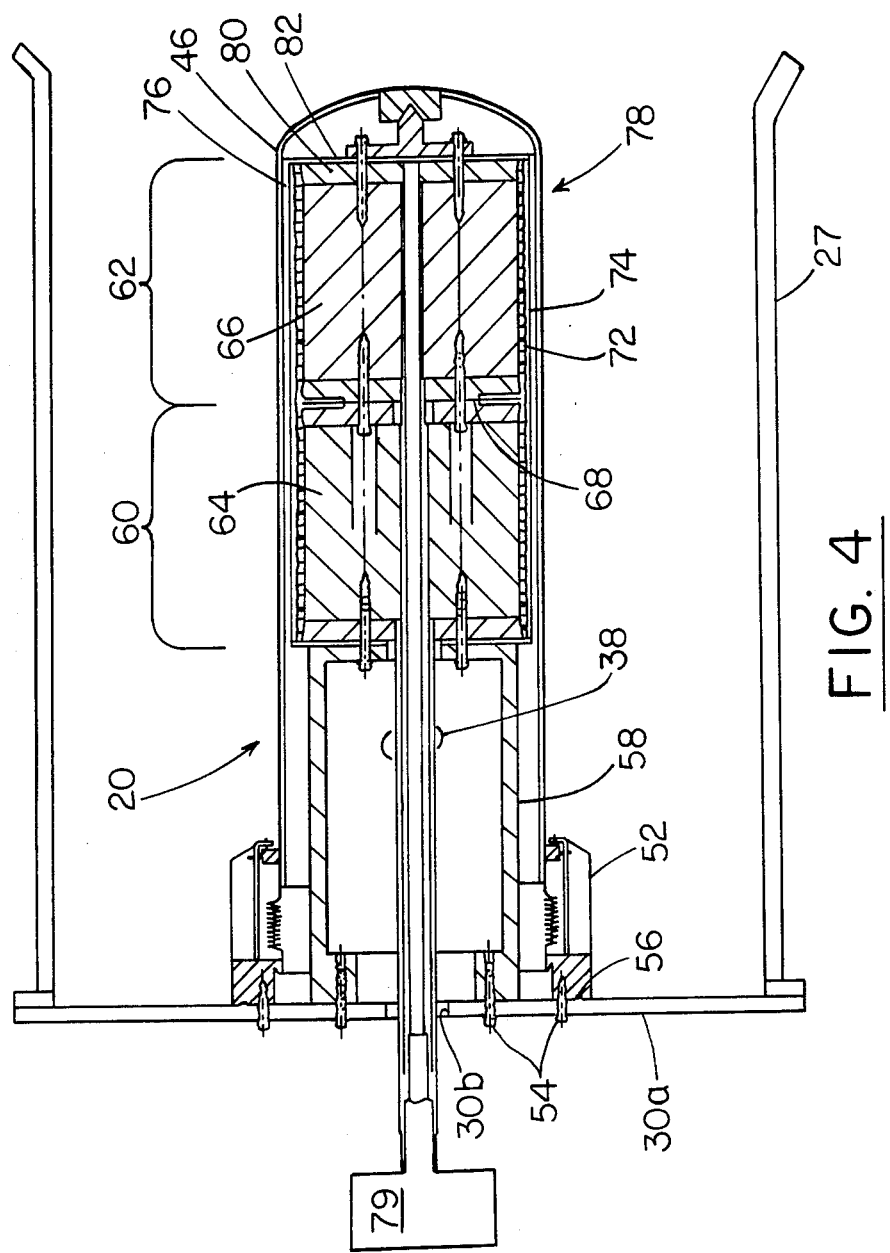
FIG. 4 is a sectional view of the poloidal flux-amplifying inductive transformer of the present invention.

Referring to FIG. 4, there is shown a sectional view in greater detail of the inductive poloidal flux transformer 20 of the present invention. The flux transformer 20 is adapted for mounting to a plate 30a of the vacuum vessel. The proximal end portion of the flux transformer 20 thus includes a mounting bracket 52 adapted to receive a plurality of threaded mounting bolts 54 for securely positioning the mounting bracket upon the vacuum vessel plate 30a. A vacuum seal 56, preferably comprised of viton, is disposed around the periphery of the proximal end portion of the mounting bracket 52 and forms a vacuum seal between the mounting bracket and the vacuum vessel plate 30a. A mounting cylinder 58 is adapted for threadably engaging an inner portion of the mounting bracket 52 and is thus also securely mounted to and supported by the vacuum vessel plate 30a by means of a plurality of mounting bolts 54. The mounting bracket 52 and mounting cylinder 58 are coaxially disposed about an aperture 30b within the vacuum vessel plate 30a. Extending through the vacuum vessel plate aperture 30b is a coaxial conductor 38. The coaxial conductor 38 extends through and beyond the mounting cylinder 58 and into a winding portion 78 of the poloidal flux transformer 20. The winding portion 78 of the poloidal flux transformer 20 is comprised of a proximal support cylinder 64 and a distal support cylinder 66. Proximal support cylinder 64 is coupled to the distal end portion of the mounting cylinder 58 by means of a plurality of threaded coupling bolts, while the proximal and distal support cylinders 64, 66 are similarly coupled together by means of a plurality of threaded coupling bolts. Disposed around the periphery of the proximal support cylinder 64 is a first coil 60 wound in a left hand helix therearound. Similarly, positioned upon and disposed about the periphery of the distal support cylinder 66 is a second coil 62 wound therearound in a right hand helix. Each of the first and second coils 60, 62 is comprised of copper wire, with an electrical connection 68 provided therebetween and disposed intermediate the proximal and distal support cylinders 64, 66. The coaxial conductor 38 is coupled to a second power supply 79 which provides a current to the first and second coils 60, 62 in first and second directions in a switched manner to effect a rapid change in the magnetic flux produced by these coils in facilitating the generation of a spheromak plasma. Concentrically disposed about the poloidal flux transformer 20 and along the length thereof is the aforementioned conductive cylinder 27 which enhances the magnetic flux produced by the poloidal flux transformer. The conductive cylinder 27 is also securely mounted to the vacuum vessel plate 30a.

Disposed around the first and second coils 60, 62 is a coolant tube 72, also preferably comprised of copper, with a stainless steel inner liner 74 disposed immediately adjacent to and outside of the coolant tube. Positioned outside of the inner liner 74 is a current transformer outer liner assembly 46 preferably comprised of stainless steel. Disposed between the inner liner 74 and the outer liner 46 is a liner backing 76 extending the length of and enclosing the proximal and distal support cylinders 64, 66. Current feed discs 80 having respective apertures therein are positioned on each end of the proximal and distal support cylinders 64, 66, while a winding end plate 82 is disposed on each end of each of the support cylinders and in intimate contact with the outer surface of an immediately adjacent current feed disc. A spheromak plasma is formed by the combination of the flux core 22 and the poloidal flux transformer 20 in the following manner.

The currents from the toroidal field and poloidal field power supplies (not shown) coupled to the flux core 22 are programmed to produce poloidal and toroidal plasma currents respectively within the toroidal and poloidal field coils simultaneously, so that the magnetic configuration can be guided toward that of a Taylor minimum energy state. Initially, a steady state equilibrium field is generated by the plurality of equilibrium field coils disposed around the flux core 22 to support the final plasma equilibrium. A poloidal flux generated by the toroidal current inside the flux core 22 is then pulsed on. The superposition of the equilibrium and poloidal fields creates a field weaker on the small major radius side of the flux core 22, or to the right thereof as shown in FIG. 2. The aforementioned toroidal solenoid within the flux core 22 is then pushed on at time T=0, and a plasma discharge is initiated. The increasing toroidal flux on the toroidal solenoid within the flux core 22 induces a poloidal current on the toroidally concentric plasma surrounding the flux core. The associated toroidal field distends the plasma 32, stretching it toward the spheromak fusion reactor axis where the poloidal field is weakest as shown in FIG. 5a. Simultaneously, the toroidal current within the flux core 22 is reduced to induce a toroidal current in the plasma 32. Magnetic reconnection of the poloidal field occurs and a plasma toroid is created as shown in FIG. 5b.

The large current within the poloidal flux transformer 20 which has produced a large poloidal flux $\psi$ is then reversed, resulting in a swing in the poloidal flux and the conversion of a portion of the poloidal flux to toroidal flux $\phi$. The toroidal flux transferred to the plasma amplifies the separated plasma 32 and allows it to be translated into the reaction chamber 12 as shown in FIG. 5c.

The poloidal flux transformer 20 shown in FIG. 4 is intended for use with the S-1 Spheromak device at the Plasma Physics Laboratory at Princeton University in Princeton, N.J., and consists of 20 turns of 3 centimeters radius and has an overall length of 24 centimeters. A flux transformer current of 10 kA produces as flux of 0.003 volt-sec. The transformer is preferably supported by a 4 centimeter outer diameter Teflon tube forming the liner backing 76, which is covered with a 0.025 millimeter thick sheet of stainless steel forming the outer liner 46. The poloidal flux transformer 20 is of minimum cross-sectional area in order to minimize perturbations of the spheromak equilibrium such that magnetic field distributions exhibit little difference between discharges with and without the Teflon liner backing 76. The inductance of the poloidal flux transformer 20 is such that the current risetime is less than the plasma life time, and the capacitance of the transformer bank, or power supply, 79 is large enough to provide a substantial transformer current at a reasonable charging voltage. These constraints were satisfied with a capacitance of 60 $\mu F$, and a transformer inductance of 0.5 $\mu H$, which gives a risetime of 35 $\mu s$ and a 1 amp peak current for 1 volt on the capacitor. Peak currents of 15 kA are used in the poloidal flux transformer 20 in the S-1 Spheromak device. Each of the equilibrium field pulsed coils 48 is comprised of two turns and has a radius of 18 cm and Z positions of ±13 cm relative to the flux core 22. The equilibrium field pulse coils 48 produce a radially compressive field in the midplane of the flux core 22 so as to pinch the spheromak plasma as shown in FIG. 5b and disconnect it from the flux core.

As indicated above, the poloidal flux transformer 20 drives a toroidal current in the spheromak plasma 32 and relaxation of the plasma toward the Taylor minimum energy state maintains the proper spheromak equilibrium profiles by converting some poloidal flux into toroidal flux. Alternatively, the poloidal flux transformer 20 may be energized prior to the plasma generating discharge. After (or during) spheromak formation using the flux core 22, the current in the poloidal flux transformer 20 may be reduced, thus driving a toroidal current within the spheromak plasma. After the transformer current is brought to zero, there are two operating options:

1. Translation of the spheromak plasma out of the formation and amplification region in the linear portion of the reactor toward the reaction chamber; and
2. Further sustaining of the spheromak plasma configuration by one of a variety of methods, including reversal of the current within the poloidal flux transformer (double-swinging), oscillating field current drive (OFCD) using the flux core 22, or oscillation of the currents in both the poloidal flux transformer and the flux core.

Figure 6:
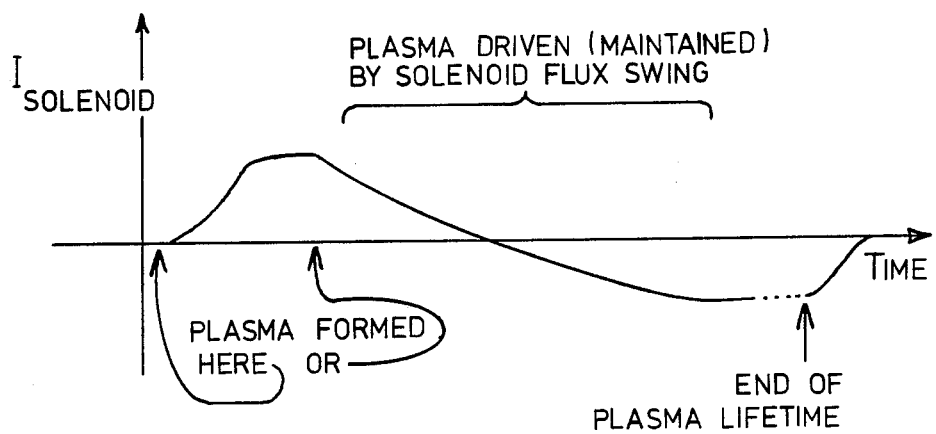
FIG. 6 illustrates the formation and termination of a spheromak plasma as a function of the current in the poloidal flux-amplifying inductive transformer of the present invention.

Referring to FIG. 6, there is shown the formation of a plasma in time using the poloidal flux-amplifying inductive transformer of the present invention as a function of the current within the solenoidal transformer. From the figure, it can be seen that increasing current flows in a first direction within the solenoidal transformer resulting in the formation of a spheromak plasma. The current within the solenoidal transformer is then reversed resulting in a poloidal flux swing and the conversion of a portion of the poloidal flux to toroidal flux.

The poloidal film transformer of the present invention injects magnetic helicity into the already formed spheromak plasma configuration by appropriately reversing the current therein. It is the poloidal flux and the time rate of change of toroidal flux that contribute to the helicity injection. Reversal of the current within the poloidal flux transformer results in oscillation between the poloidal and toroidal magnetic fields of the transformer. A net helicity is injected from the poloidal flux transformer into the plasma on an average over a period of oscillation, or current reversal. The phasing is chosen to maximize the average helicity input rate. This $\psi$–$\phi$ pumping works because of the nonlinear behavior of the magnetics.

Figure 7:
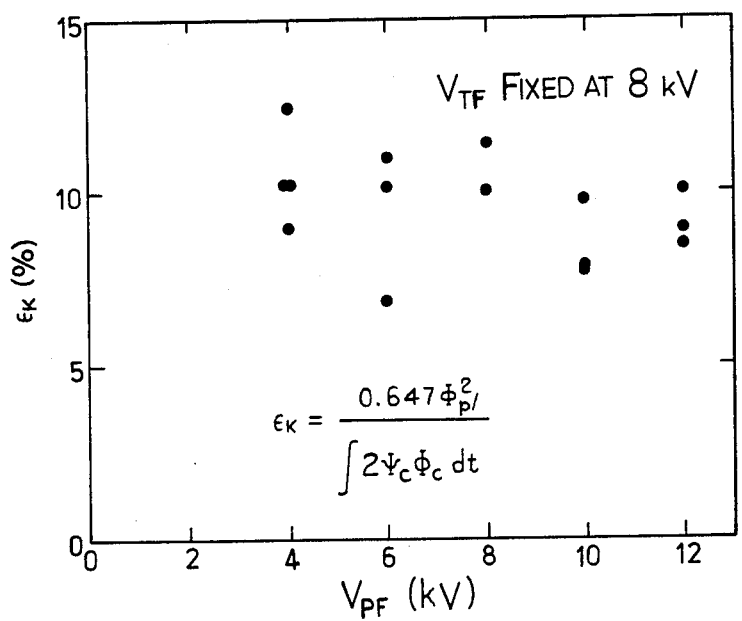
FIG. 7 is a graphical illustration of the helicity injection efficiency, $\epsilon_k$, vs. the poloidal flux bank voltage, $V_{PF}$, with the toroidal flux bank voltage, $V_{TF}$, fixed.

The results of preliminary experiments of a poloidal flux transformer in accordance with the present invention used in S-1 Spheromak device are graphically illustrated in FIG. 7, which is a plot of the helicity injection efficiency, $\epsilon_K$, as a function of variation in poloidal flux bank voltage, with toroidal flux bank voltage fixed at 8 kV. As shown in FIG. 7, the efficiency factor in terms of the injection of helicity in the spheromak device is only weakly dependent upon the ratio of poloidal flux voltage to toroidal flux voltage for sufficiently high values of toroidal flux voltage, i.e., on the order of 8 kV. The substantial insensitivity of the helicity injection efficiency in the spheromak device to the poloidal and toroidal flux bank voltages using the poloidal flux transformer of the present invention indicates that the spheromak plasma thus formed is stable and has associated therewith the necessary coupling between the spheromak plasma and the flux core.

There has thus been shown an inductive poloidal flux transformer for generating and sustaining a spheromak plasma. Rapid current reversal within the poloidal flux transformer results in poloidal and toroidal flux conversion necessary for stable spheromak plasma formation and sustainment.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustraton only and not as a limitation. The actual scope of the invention is intended to be defined in the following claims when viewed in their proper perspective based on the prior art.

The embodiments of the invention in which an exclusive property or privilege is claimed are defined as follows:

1. Apparatus for forming and sustaining a spheromak plasma comprising:
   a closed vacuum vessel having a longitudinal axis;
   a generally circular conductive core disposed within said vacuum vessel symmetrically with respect to and along the longitudinal axis of said vacuum vessel, said conductive core having a plurality of electrical currents flowing therein for rapidly generating in an alternating manner first poloidal and toroidal magnetic fields, respectively, about said conductive core so as to form a spheromak plasma; and
   an inductive transformer disposed radially inwardly of said conductive core and said spheromak plasma and spaced therefrom, said inductive transformer being coaxial with said longitudinal axis of said vacuum vessel, said inductive transformer having a current flowing therein for producing a second poloidal magnetic field about said conductive core, means for rapidly reversing said inductive transformer current and for converting said second poloidal magnetic field to a second toroidal magnetic field about said conductive core for facilitating the formation of and sustaining the spheromak plasma.

2. Apparatus for forming and sustaining a spheromak plasma comprising:
   a closed vacuum vessel having a longitudinal axis;
   a generally circular conductive core disposed within and symmetrically about the longitudinal axis of said vacuum vessel, said conductive core including current carrying poloidal and toroidal flux coils, means for rapidly reversing the currents in said poloidal and toroidal flux coils in a sequential manner for alternately generating first poloidal and toroidal magnetic fields, respectively, about said conductive core so as to form a spheromak plasma; and
   inductive transformer means disposed radially inwardly of said circular conductor and said spheromak plasma and spaced therefrom, said inductive transformer being coaxial with said longitudinal axis of said vacuum vessel, said inductive transformer means having a current flowing therein for producing a second poloidal magnetic field about said conductive core, means for rapidly reversing said inductive transformer current and for converting said second poloidal magnetic field is converted to a second toroidal magnetic field about said conductive core for facilitating the formation of and sustaining the spheromak plasma, said inductive transformer means including an elongated coaxial conductor aligned along the longitudinal axis of said vacuum vessel and a plurality of conductive windings positioned on an end of and electrically coupled to said coaxial conductor and disposed generally within said conductive core.

3. Apparatus for forming and sustaining a spheromak plasma comprising:
   a closed vacuum vessel having a longitudinal axis;
   equilibrium field coil means for producing an equilibrium magnetic field along the longitudinal axis of said vacuum vessel;
   a generally circular conductive core disposed within and symmetrically about the longitudinal axis of said vacuum vessel, said conductive core including current carrying poloidal and toroidal flux coils, means for rapidly reversing the currents in said poloidal and toroidal flux coils in a sequential manner for alternately generating first poloidal and toroidal magnetic fields, respectively, about said conductive core so as to form a spheromak plasma;
   a conductive cylinder mounted to an inner wall of said vacuum vessel and aligned with and positioned along the longitudinal axis of said vacuum vessel, said conductive cylinder extending from the vacuum vessel inner wall to within said generally circular conductive core; and
   inductive transformer means coaxially disposed within and along the length of said conductive cylinder and aligned along the longitudinal axis of said vacuum vessel, said inductive transformer means further extending through said conductive core and having a current flowing therein for producing a second poloidal magnetic field about said conductive core, said conductive cylinder being spaced radially inwardly of both said spheromak plasma and said conductive core, means for rapidly reversing the inductive transformer current and for converting said second poloidal magnetic field to a second toroidal magnetic field about said conductive core for facilitating the formation of and sustaining the spheromak plasma, said inductive transformer means including an elongated coaxial conductor aligned along the longitudinal axis of said vacuum vessel and a plurality of conductive windings positioned on an end of and electrically coupled to said coaxial conductor and disposed generally within said conductive core.

* * * * *